United States Patent
Onishi et al.

(10) Patent No.: US 9,897,016 B2
(45) Date of Patent: Feb. 20, 2018

(54) APPARATUS FOR CONTROLLING THE FUEL SUPPLY OF AN INTERNAL COMBUSTION ENGINE

(71) Applicants: TOYOTA JIDOSHA KABUSHIKI KAISHA, Toyota-shi, Aichi-ken (JP); Aisan Kogyo Kabushiki Kaisha, Obu-shi, Aichi-ken (JP)

(72) Inventors: Akito Onishi, Nagoya (JP); Hirotaka Shirasawa, Chita (JP)

(73) Assignees: TOYOTA JIDOSHA KABUSHIKI KAISHA, Toyota (JP); AISAN KOGYO KABUSHIKI KAISHA, Obu-shi (JP)

( * ) Notice: Subject to any disclaimer, the term of this patent is extended or adjusted under 35 U.S.C. 154(b) by 68 days.

(21) Appl. No.: 15/037,909

(22) PCT Filed: Nov. 21, 2014

(86) PCT No.: PCT/IB2014/002762
§ 371 (c)(1),
(2) Date: May 19, 2016

(87) PCT Pub. No.: WO2015/075545
PCT Pub. Date: May 28, 2015

(65) Prior Publication Data
US 2016/0290249 A1  Oct. 6, 2016

(30) Foreign Application Priority Data
Nov. 21, 2013 (JP) ................................. 2013-240569

(51) Int. Cl.
F02B 13/00 (2006.01)
F02D 19/06 (2006.01)
(Continued)

(52) U.S. Cl.
CPC ...... *F02D 19/0615* (2013.01); *F02D 19/0623* (2013.01); *F02D 19/0647* (2013.01);
(Continued)

(58) Field of Classification Search
CPC .... F02D 19/00; F02D 19/021; F02D 19/0613; F02D 19/066; F02M 21/0215; F02M 37/0064; F02M 43/00
(Continued)

(56) References Cited

U.S. PATENT DOCUMENTS 4,563,992 A * 1/1986 Kobayashi ........... F02M 41/125
123/458
5,239,968 A * 8/1993 Rodriguez-Amaya F02M 59/366
123/458
(Continued)

FOREIGN PATENT DOCUMENTS

JP  2002-038986 A  2/2002
JP  2003-293807 A  10/2003
(Continued)

*Primary Examiner* — John Kwon
(74) *Attorney, Agent, or Firm* — Oliff PLC

(57) ABSTRACT

On the basis of a decrease in a high-pressure detection value and a low-pressure detection value during fuel control using a CNG injector, an electronic control unit automatically switches the combustion control to combustion control using a gasoline injector even when the amount of CNG remaining is insufficient. When the first shutoff valve is forcibly switched to an closed state by inputting a forcible shutoff command of a first shutoff valve to a terminal and the combustion control using the CNG injector is performed, a switching process to the combustion control using the gasoline injector is inhibited regardless of the decrease in the high-pressure detection value and the low-pressure detection value.

6 Claims, 5 Drawing Sheets

(51) Int. Cl.
*F02D 41/30* (2006.01)
*F02D 41/00* (2006.01)
*F02D 41/22* (2006.01)

(52) U.S. Cl.
CPC ..... *F02D 41/0025* (2013.01); *F02D 41/0027* (2013.01); *F02D 41/22* (2013.01); *F02D 41/3094* (2013.01); *F02D 2041/225* (2013.01); *F02D 2200/0602* (2013.01); *Y02T 10/36* (2013.01)

(58) Field of Classification Search
USPC ........ 123/575–578, 673, 679–682, 690–692; 701/103, 113, 114
See application file for complete search history.

(56) References Cited

U.S. PATENT DOCUMENTS

| | | | | |
|---|---|---|---|---|
| 5,752,489 | A | * | 5/1998 | Henderson ......... F02M 21/0269 123/494 |
| 2010/0307614 | A1 | * | 12/2010 | Basaglia ................ F02M 37/10 137/544 |
| 2012/0245825 | A1 | | 9/2012 | Nakayama et al. |
| 2012/0291758 | A1 | | 11/2012 | Saito |
| 2013/0000752 | A1 | | 1/2013 | Saito et al. |
| 2013/0340717 | A1 | * | 12/2013 | Avery ..................... F02D 41/30 123/478 |

FOREIGN PATENT DOCUMENTS

| | | |
|---|---|---|
| JP | 2005-320874 A | 11/2005 |
| JP | 2008-231938 A | 10/2008 |
| JP | 2011-163155 A | 8/2011 |
| JP | 2011-196258 A | 10/2011 |

* cited by examiner

APPARATUS FOR CONTROLLING THE FUEL SUPPLY OF AN INTERNAL COMBUSTION ENGINE

BACKGROUND OF THE INVENTION

1. Field of the Invention

The present invention relates to a fuel supply control device for an internal combustion engine that is applied to a fuel supply unit including a first injector and a second injector for supplying fuel to a combustion chamber of the internal combustion engine.

2. Description of Related Art

For example, as described in Japanese Patent Application Publication No. 2003-293807 (JP 2003-293807 A), a bifuel internal combustion engine has been proposed which can perform combustion control using both gasoline and CNG. The bifuel internal combustion engine is implemented by providing a gasoline supply path from a gasoline tank to a gasoline injector (first fuel injection valve) and a CNG supply path from a CNG tank to a CNG injector (second fuel injection valve). JP 2003-293807 A proposes that the combustion control is automatically switched to combustion control using the gasoline injector when the amount of CNG remaining decreases while performing combustion control using the CNG injector.

On the other hand, as described in Japanese Patent Application Publication No. 2008-231938 (JP 2008-231938 A), an internal combustion engine has been proposed in which a manual switching valve which is shut off when component replacement is carried out is disposed between a fuel tank storing LPG and a delivery pipe connected to an injector (paragraph "0030").

SUMMARY OF THE INVENTION

In a bifuel internal combustion engine, it is assumed that a component such as a CNG injector must be replaced. In order to replace a component such as a CNG injector, it is necessary to remove CNG in a supply passage for supplying CNG to the CNG injector before the replacement of components. This can be implemented by providing a shutoff valve proposed in JP 2008-231938 A, shutting off the shutoff valve, and then performing combustion control of the internal combustion engine through fuel injection control using the CNG injector. As described above, in the internal combustion engine in which automatic switching to the combustion control using the gasoline injector is carried out with a decrease in the amount of CNG remaining, since the combustion control using the gasoline injector is carried out after the switching, CNG is not injected from the CNG injector. Accordingly, the use of the combustion control technique using the CNG injector may cause the work of removing CNG not to be satisfactorily carried out.

The invention provides a fuel supply control device for an internal combustion engine that can satisfactorily remove gaseous fuel in a fuel supply passage for supplying the gaseous fuel to an injector through the use of combustion control using the injector.

According to an aspect of the invention, there is provided a fuel supply control device for an internal combustion engine.

Technical Idea 1

The fuel supply control device includes a first injector, a first shutoff valve, a second injector, and an electronic control unit. The first injector is configured to supply gaseous fuel to a combustion chamber of the internal combustion engine. The first shutoff valve is configured to shut off a fuel supply passage between a first reservoir unit and the first injector. The first reservoir unit is configured to store the gaseous fuel to be supplied to the first injector. The second injector is configured to supply fuel to the combustion chamber. A first passage that is a passage between the first shutoff valve and the first injector out of the fuel supply passage is different from a second passage for supplying fuel to the second injector. The electronic control unit is configured to perform a switching process of switching a mode in which combustion control of the internal combustion engine by fuel injection control using the first injector is performed to a mode in which combustion control of the internal combustion engine by fuel injection control using the second injector is performed. The electronic control unit is configured to inhibit the performing of the switching process when a communication state of the fuel supply passage is an closed state in which the first shutoff valve shuts off the fuel supply passage and the combustion control using the first injector is performed.

In the fuel supply control device, the combustion control using the first injector is performed when the shutoff valve is switched to the closed state. Accordingly, it is possible to consume the gaseous fuel in the first passage by the combustion control. When the switching process is performed by the electronic control unit, the combustion control using the first injector is not performed and thus the gaseous fuel in the first passage may not be consumed. Accordingly, it is possible to suppress such a situation by inhibiting the performing of the switching process and to satisfactorily remove the gaseous fuel in the first passage.

Technical Idea 2

The fuel supply control device may further include a second reservoir unit and a pressure sensor. The second reservoir unit may be configured to store fuel to be supplied to the second injector. The pressure sensor may be configured to detect a pressure in the first passage. The electronic control unit may be configured to perform the switching process when the combustion control using the first injector is performed and it is determined that the pressure detected by the pressure sensor decreases.

When the shutoff valve is switched to the closed state and the combustion control using the first injector is performed, the pressure in the first passage decreases. When the pressure detected by the pressure sensor decreases and the performing of the switching process by the electronic control unit is not inhibited, the switching process is performed by the electronic control unit.

Technical Idea 3

In the fuel supply control device, the electronic control unit may be configured to inhibit the performing of the switching process when the first shutoff valve is in the closed state and the combustion control using the first injector is performed even when it is determined that the pressure detected by the pressure sensor decreases.

Technical Idea 4

In the fuel supply control device, the electronic control unit may be configured to perform the switching process when it is determined that the fuel injection control using the first injector is abnormal.

In the fuel supply control device, when it is determined that the fuel injection control using the first injector is abnormal, the switching process is performed by the electronic control unit. Accordingly, when the shutoff valve is switched to the closed state, the combustion control using the first injector is performed, and it is determined that there is abnormality, there is a possibility that the gaseous fuel in the first passage will not be removed depending on the combustion control using the first injector by performing the switching process. Accordingly, the process of inhibiting the performing of the switching process is particularly useful.

Technical Idea 5

In the fuel supply control device, the electronic control unit may be configured to open the first shutoff valve when the mode in which the combustion control using the first injector is performed is selected. The electronic control unit may be configured to receive an input of a forcible shutoff command for shutting off the first shutoff valve instead of opening the first shutoff valve.

In the fuel supply control device, an opening control unit has a function of performing the combustion control using the first injector by causing the first injector and the reservoir unit to communicate with each other. When the gaseous fuel in the first passage is intended to be removed, the process of opening the shutoff valve by the opening control unit serves to interfere with the removing of the gaseous fuel. Accordingly, by providing an input unit and enabling holding of the closed state of the shutoff valve when the combustion control using the first injector is performed, it is possible to satisfactorily suppress a state where the process of removing the gaseous fuel in the first passage is interfered with by the opening control unit.

Technical Idea 6

The fuel supply control device may further include a regulator and a second shutoff valve. The regulator may be disposed in the first passage. The second shutoff valve may be disposed in the first passage between the first shutoff valve and the regulator. The electronic control unit may be configured to inhibit the performing of the switching process when the combustion control using the first injector is performed in a state where the second shutoff valve is opened and the first shutoff valve is shut off.

In the fuel supply control device, the combustion control using the first injector is performed in the state where the second shutoff valve is in the open state and the first shutoff valve is in the closed state. In this state, the first passage that is a passage located downstream of the first shutoff valve and connected to the first injector is not divided into two parts by the second shutoff valve. Accordingly, by performing the combustion control using the first injector in this state, it is possible to satisfactorily remove the gaseous fuel in the first passage.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Hereinafter, a fuel supply control device of an internal combustion engine according to a first embodiment of the invention will be described with reference to the accompanying drawings.

Figure 1:
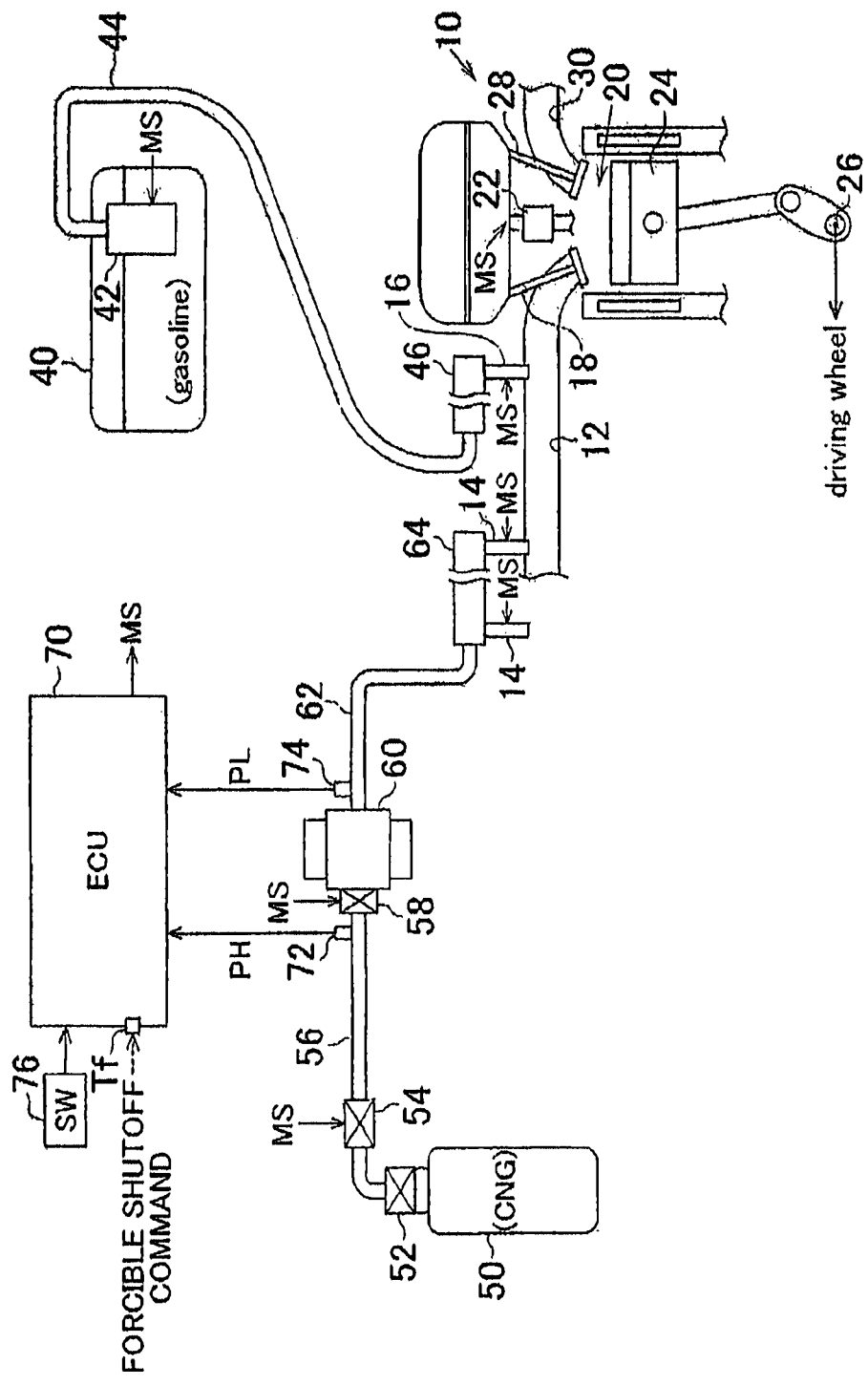
FIG. 1 is a diagram illustrating a configuration of a system according to a first embodiment of the invention.

An internal combustion engine 10 illustrated in FIG. 1 is a bifuel internal combustion engine that can use, as fuel, compressed natural gas (CNG) as gaseous fuel and gasoline as liquid fuel which is alternative fuel to the CNG. In this embodiment, a multi-cylinder internal combustion engine is considered as the internal combustion engine 10, but only one cylinder is explicitly illustrated in the drawing.

The intake gas passage 12 of the internal combustion engine 10 is provided with a CNG injector 14 and a gasoline injector 16. In the intake gas passage 12, a fuel-air mixture including the fuel injected from the CNG injector 14 or the gasoline injector 16 into the intake gas passage 12 and the intake air is generated. The fuel-air mixture is introduced into the combustion chamber 20 by opening the intake gas valve 18. In a combustion chamber 20, when the fuel-air mixture is combusted by ignition with an ignition plug 22, the combustion energy is converted into rotational energy of a crank shaft 26 mechanically connected to driving wheels (not illustrated) of a vehicle via a piston 24. Thereafter, by opening an exhaust gas valve 28, the fuel-air mixture provided to the combustion is discharged as exhaust gas to an exhaust gas passage 30.

A fuel supply unit for supplying fuel to the combustion chamber 20 of the internal combustion engine 10 will be described below. CNG supplied to the CNG injector 14 is reserved in a CNG tank 50. The CNG in the CNG tank 50 is supplied to a CNG delivery pipe 64 via a high-pressure passage 56 and a low-pressure passage 62. The CNG in the CNG delivery pipe 64 is injected into the intake gas passage 12 from the CNG injector 14 corresponding to each cylinder. A manual switching valve 52 which is a manual-driving type of switching valve and an electromagnetic-driving type of first shutoff valve 54 are disposed between the CNG tank 50 and the high-pressure passage 56.

A regulator 60 reducing the pressure of the CNG supplied from the CNG tank 50 via an electromagnetic-driving type of second shutoff valve 58 to a predetermined pressure is disposed downstream of the high-pressure passage 56, the CNG depressurized to the predetermined pressure is supplied to the CNG delivery pipe 64 via the low-pressure passage 62. In addition, in this embodiment, the second shutoff valve 58 and the regulator 60 are integrally formed with each other.

A high-pressure pressure sensor 72 is disposed upstream of the regulator 60, and a low-pressure pressure sensor 74 is disposed downstream of the regulator 60. In addition, the high-pressure pressure sensor 72 detects the pressure in the high-pressure passage 56 upstream of the second shutoff valve 58 as a high-pressure detection value PH. The low-pressure pressure sensor 74 detects the pressure in the low-pressure passage 62 as a low-pressure detection value PL.

On the other hand, the gasoline supplied to the gasoline injector 16 is reversed in a gasoline tank 40. The gasoline in the gasoline tank 40 is suctioned by a fuel pump 42 and is supplied to a gasoline delivery pipe 46 via a gasoline supply passage 44. The gasoline in the gasoline delivery pipe 46 is injected into the intake gas passage 12 from the gasoline injector 16 corresponding to each cylinder.

An ECU 70 is an electronic control unit configured to perform control (combustion control of the internal combustion engine 10) of combusting the fuel-air mixture in the combustion chamber 20 by outputting operation signals MS to various actuators such as the first shutoff valve 54, the second shutoff valve 58, the CNG injector 14, the gasoline injector 16, the ignition plug 22, and the fuel pump 42. The ECU 70 is connected to a selection switch 76 used for a user to select any one of a mode in which combustion control of the internal combustion engine 10 by fuel injection control using the CNG injector 14 is performed and a mode in which combustion control of the internal combustion engine 10 by fuel injection control using the gasoline injector 16 is performed. Accordingly, the ECU 70 determines one of the mode in which the combustion control using the CNG is performed and the mode in which the combustion control using the gasoline is performed, in consideration of the operation of the selection switch 76.

When the mode in which the combustion control using the CNG is performed is employed to perform the combustion control, the ECU 70 causes the CNG injector 14 and the CNG tank 50 to communicate with each other by switching the first shutoff valve 54 and the second shutoff valve 58 to an open state, in principle. Then, the ECU 70 switches the CNG injector 14 to inject the CNG into the intake gas passage 12 from the CNG injector 14. On the other hand, when the mode in which the combustion control using the gasoline injector 16 is performed is employed to perform the combustion control, the ECU 70 drives the fuel pump 42 to supply the gasoline in the gasoline tank 40 to the gasoline injector 16. Then, the ECU 70 switches the gasoline injector 16 to inject the gasoline into the intake gas passage 12 from the gasoline injector 16. When the combustion control using the CNG injector 14 is not performed, the ECU 70 shuts off the connection between the CNG injector 14 and the CNG tank 50 by switching the first shutoff valve 54 and the second shutoff valve 58 to an closed state. In addition, it is preferable that the first shutoff valve 54 and the second shutoff valve 58 be of a normally-shut type.

Even when the mode in which the combustion control using the CNG injector 14 is performed is instructed by a user's operation of the selection switch 76, the ECU 70 automatically switches the mode to the mode in which the combustion control using the gasoline injector 16 is performed under a predetermined condition. In this embodiment, the predetermined condition is a condition in which it is determined when the amount of CNG remaining in the CNG tank 50 decreases. This is intended to avoid a state where requested dynamic power is not applied to the driving wheels by stoppage of the internal combustion engine 10 (so-called engine stall).

The ECU 70 includes a terminal Tf to which a command signal (forcible shutoff command) for forcibly shutting off the first shutoff valve 54 is input from the outside. This is intended to shut off the communication between the CNG tank 50 and the high-pressure passage 56 at the time of replacement of a component such as the regulator 60, the CNG delivery pipe 64, or the CNG injector 14. In addition, the manual switching valve 52 in addition to the first shutoff valve 54 can be used to shut off the communication between the CNG tank 50 and the high-pressure passage 56. However, in this embodiment, it is assumed that a sensor for detecting the open/closed state of the manual switching valve 52 is not provided. Accordingly, even when the manual switching valve 52 is switched to the closed state, the ECU 70 cannot recognize the state. One object of inputting a forcibly-open/closed command from the terminal Tf is to allow the ECU 70 to recognize that the communication between the CNG tank and the high-pressure passage 56 is shut off for the purpose of replacement of a component.

The process when the mode in which the combustion control using the CNG injector 14 is performed is selected and the switching process when the mode in which the combustion control using the gasoline injector 16 is performed is selected will be described below.

Figure 2:
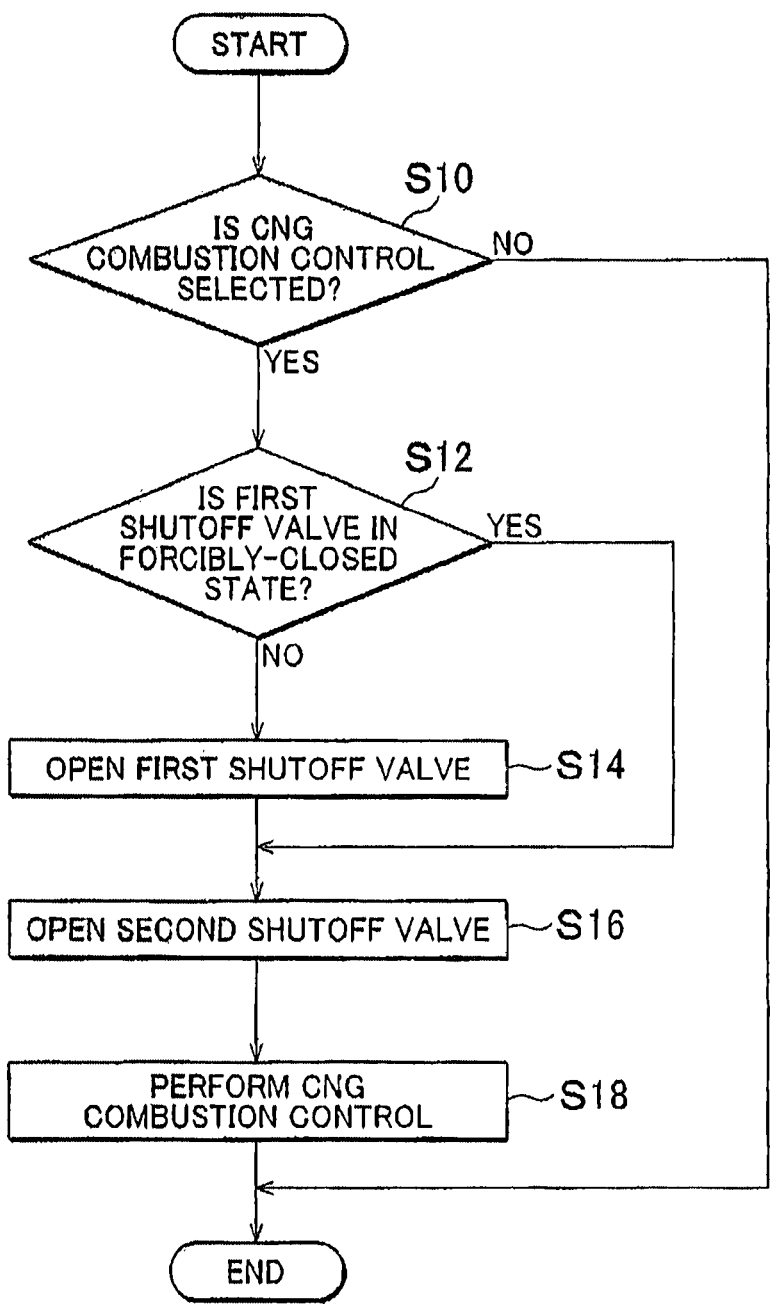
FIG. 2 is a flowchart illustrating a process flow of a CNG combustion control process according to the first embodiment.

FIG. 2 illustrates a process flow of the combustion control using the CNG injector 14. This process flow is repeatedly performed, for example, with a predetermined cycle by the ECU 70. In this series of processes, the ECU 70 first determines whether the mode in which the combustion control using the CNG is performed is selected by the operation of the selection switch 76 (S10). When it is determined that the mode in which the combustion control using the CNG is performed is selected (YES in step S10), the ECU 70 determines whether the first shutoff valve 54 is in the state (forcibly-closed state) where it is forcibly shut off by the input of the forcible shutoff command from the terminal Tf (S12). When it is determined that the first shutoff valve 54 is not in the forcibly-closed state (NO in step S12), the ECU 70 opens the first shutoff valve 54 (S14).

When the first shutoff valve 54 is opened, the ECU 70 opens the second shutoff valve 58 (S16) and performs the combustion control of the internal combustion engine 10 by the fuel injection control using the CNG injector 14 (S18). On the other hand, when it is determined that the first shutoff valve 54 is in the forcibly-closed state (YES in step S12), the ECU 70 does not perform the process of opening the first shutoff valve 54, but opens the second shutoff valve 58 (S16) and performs the combustion control of the internal combustion engine 10 by the fuel injection control using the CNG injector 14 (S18).

Figure 3:
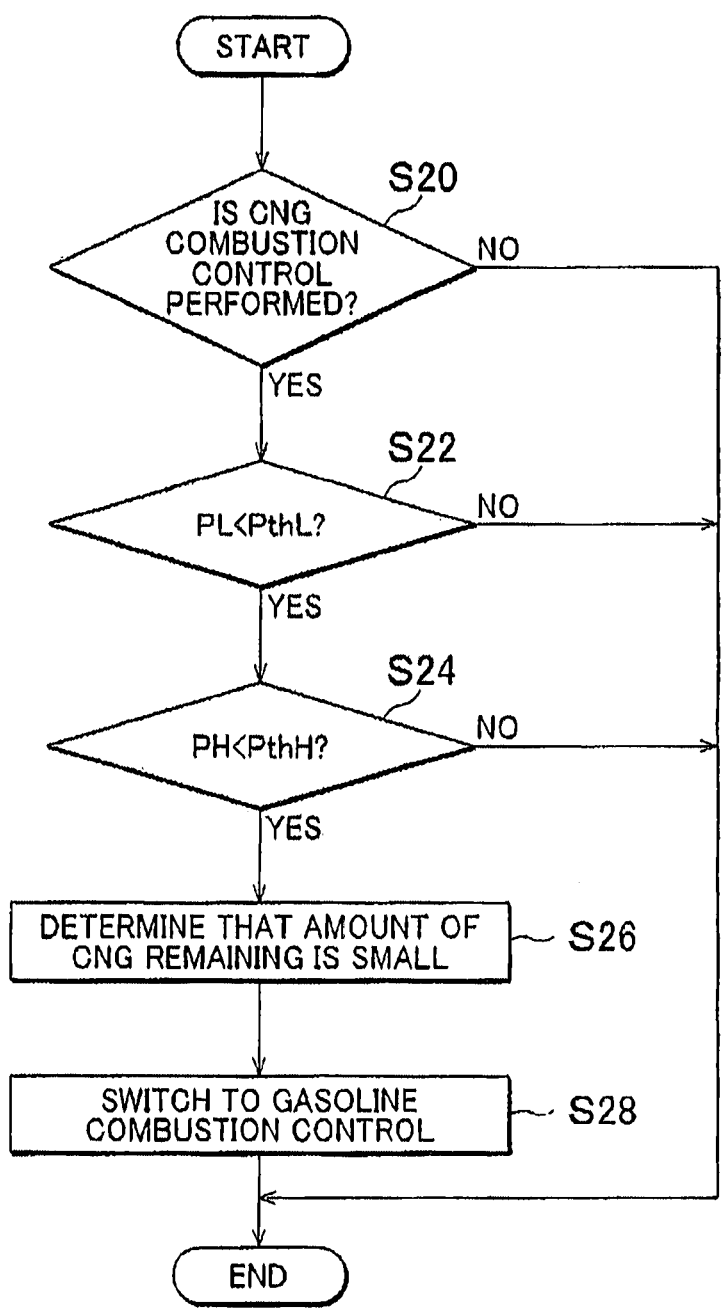
FIG. 3 is a flowchart illustrating a process flow of a switching process to a mode in which gasoline combustion control is performed according to the first embodiment.

The ECU 70 temporarily ends the series of processes when the process of step S18 is completed or the determination result of step S10 is negative. FIG. 3 illustrates a process flow of the switching process for the combustion control using the gasoline injector 16. This process flow is repeatedly performed, for example, with a predetermined cycle by the ECU 70.

In this series of processes, the ECU 70 first determines whether the combustion control using the CNG injector 14 is performed (S20). When it is determined that the combustion control using the CNG injector 14 is performed (YES in step S20), the ECU 70 determines whether the low-pressure detection value PL is smaller than a low-pressure threshold value PthL (S22). When it is determined that the low-pressure detection value PL is smaller than the low-pressure threshold value PthL (YES in step S22), the ECU 70 determines whether the high-pressure detection value PH is smaller than a high-pressure threshold value PthH (S24). When it is determined that the high-pressure detection value PH is smaller than the high-pressure threshold value PthH (YES in step S24), the ECU 70 determines that the amount of CNG remaining in the CNG tank 50 is small (S26).

Here, the use of both the high-pressure detection value PH and the low-pressure detection value PL for determining whether the amount of CNG remaining in the CNG tank 50 is small is intended to distinguish abnormality of leakage on the downstream side of the regulator 60 from the smallness of the amount of CNG remaining. That is, when the amount of CNG remaining is small and the amount of CNG to be supplied to the CNG injector 14 is insufficient, the low-pressure detection value PL decreases. However, when leakage occurs in the low-pressure passage 62 or the like, the density of CNG in the low-pressure passage 62 also decreases and thus the low-pressure detection value PL decreases. However, in this case, since the high-pressure passage 56 is supplied with CNG from the CNG tank 50, the decrease of the density is not marked. Accordingly, by using both the high-pressure detection value PH and the low-pressure detection value PL, the case in which the amount of CNG remaining is small and the case in which leakage occurs in the low-pressure passage 62 or the like can be distinguished from each other.

When it is determined that the amount of CNG remaining is small, the ECU 70 performs the switching process of automatically switching the mode to the mode in which the combustion control using the gasoline injector 16 is performed (S28). Accordingly, even when the mode in which the combustion control using the CNG injector 14 is performed is selected by the operation of the selection switch 76, the combustion control using the gasoline injector 16 is performed. The ECU 70 temporarily ends this series of processes when the switching process is performed or when the determination results of steps S20 to S24 are negative.

According to the process flow of FIG. 3, since the amount of CNG remaining in the CNG tank 50 is small and thus the mode is switched to the mode in which the combustion control using the gasoline injector 16 is performed, it is possible to satisfactorily avoid the engine stall. However, when the work of removing the CNG in the high-pressure passage 56 or the low-pressure passage 62 is performed by the combustion control using the CNG injector 14 while switching the first shutoff valve 54 to the forcibly-closed state for the purpose of replacement of a component such as the regulator 60 or the CNG injector 14, the process flow illustrated in FIG. 3 may interfere with the work.

Accordingly, in this embodiment, when the combustion control using the CNG injector 14 is performed while forcibly shutting off the first shutoff valve 54, the switching process for the combustion control using the gasoline injector 16 is inhibited. Specifically, when the forcibly shutoff command of the first shutoff valve 54 is input to the terminal Tf, the switching process is inhibited.

Figure 4:
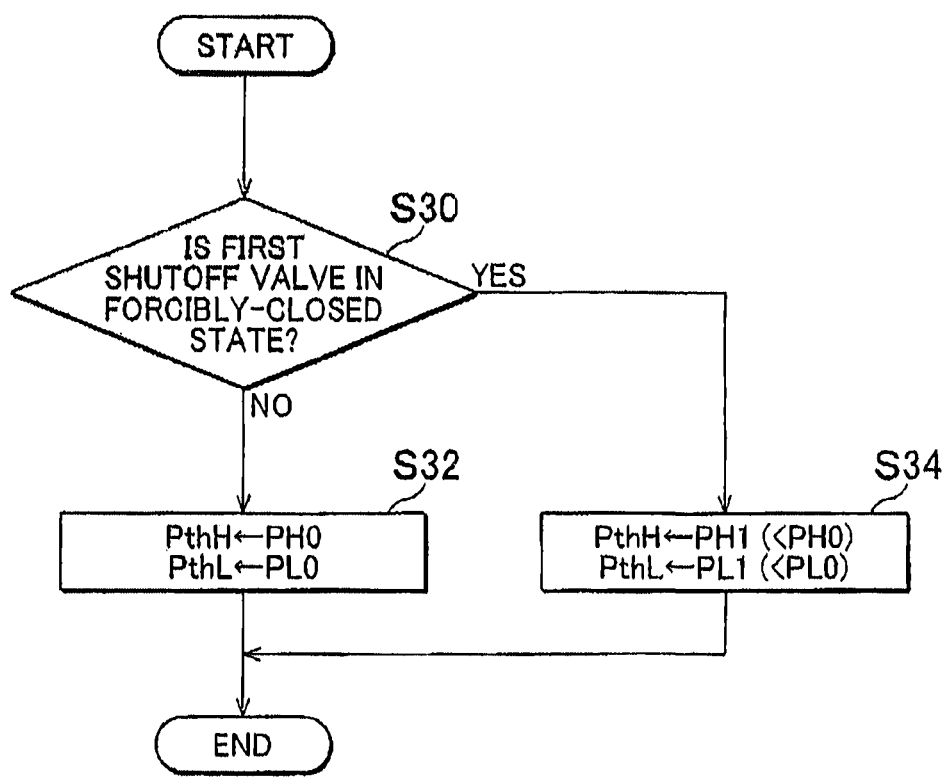
FIG. 4 is a flowchart illustrating a process flow of a process of inhibiting the switching process.

FIG. 4 illustrates a process flow of the process of inhibiting the switching process, which is performed by the ECU 70. This process flow is repeatedly performed, for example, with a predetermined cycle. That is, in this series of processes, the ECU 70 first determines whether the first shutoff valve 54 is in the forcibly-closed state in response to the input of the forcible shutoff command to the terminal Tf (S30). When it is determined that the first shutoff valve 54 is not in the forcibly-closed state (NO in step S30), the ECU 70 sets the high-pressure threshold value PthH to a high-pressure fuel shortage determination value PH0 and sets the low-pressure threshold value PthL to a low-pressure fuel shortage determination value PL0 (S32). Here, the high-pressure fuel shortage determination value PH0 is set depending on the pressure value in the high-pressure passage 56 assumed when the amount of CNG remaining in the CNG tank 50 is small, and is particularly set to a value greater than the conceivable lowest value. Here, the conceivable lowest value is a value of the pressure in the high-pressure passage 56 that is assumed to be acquired by switching the CNG injector 14 after the amount of CNG remaining in the CNG tank 50 becomes zero. On the other hand, the low-pressure fuel shortage determination value PL0 is set depending on the pressure value in the low-pressure passage 62 assumed when the amount of CNG remaining in the CNG tank 50 is small, and is particularly set to a value greater than the conceivable lowest value.

Here, the conceivable lowest value is a value of the pressure in the low-pressure passage 62 that is assumed to be acquired by switching the CNG injector 14 after the amount of CNG remaining in the CNG tank 50 becomes zero.

On the other hand, when it is determined that the first shutoff valve 54 is in the forcibly-closed state (YES in step S30), the ECU 70 sets the high-pressure threshold value PthH to a switching-inhibiting determination value PH1 and sets the low-pressure threshold value PthL to a switching-inhibiting determination value PL1 (S34). Here, the switching-inhibiting determination value PH1 is set to a value smaller than the high-pressure fuel shortage determination value PH0 and is particularly set to be a value smaller than the conceivable lowest value. On the other hand, the switching-inhibiting determination value PL1 is set to a value smaller than the low-pressure fuel shortage determination value PL0 and is particularly set to be a value smaller than the conceivable lowest value. Here, the switching-inhibiting determination values PH1, PL1 can be defined, for example, to be negative values when the unit in which the atmospheric pressure is a predetermined positive reference value is employed as the unit of the high-pressure detection value PH or the low-pressure detection value PL. Accordingly, since the state where the determination results of steps S22, S24 of FIG. 3 are positive does not occur, the switching process for the combustion control using the gasoline injector 16 is inhibited.

When the processes of steps S32, S34 are completed, the ECU 70 temporarily ends this series of processes. The operations of this embodiment will be described below.

That is, when the forcibly shutoff command is not input to the terminal Tf and the mode in which the combustion control using the CNG injector 14 is performed is selected by the operation of the selection switch 76, the mode can be switched to the mode in which the combustion control using the gasoline injector 16 is performed with the decrease in the amount of CNG remaining in the CNG tank 50. On the other hand, when the forcibly shutoff command is input to the terminal Tf and thus the first shutoff valve 54 is in the forcibly-closed state, the switching process (S28) for the mode in which the combustion control using the gasoline injector 16 is performed is inhibited by the setting of the high-pressure threshold value PthH or the low-pressure threshold value PthL (S34). Accordingly, since the combustion control using the CNG injector 14 is not stopped due to the switching process, the CNG in the high-pressure passage 56, the low-pressure passage 62, and the CNG injector 14 located downstream of the first shutoff valve 54 is consumed in the fuel injection control using the CNG injector 14.

According to the above-mentioned embodiment, the following advantages are obtained. (1) When the first shutoff valve 54 is in the forcibly-closed state, the switching process for the mode in which the combustion control using the gasoline injector 16 is performed is inhibited by setting the high-pressure threshold value PthH and the low-pressure threshold value PthL to the switching-inhibiting determination values PH1, PL1, respectively (FIG. 4). Accordingly, since the combustion control using the CNG injector 14 can be continuously performed while the first shutoff valve 54 is in the forcibly-closed state, the CNG can be satisfactorily removed from the components such as the CNG injector 14, the CNG delivery pipe 64, and the regulator 60 before the replacement of the components.

(2) The ECU 70 is provided with the terminal Tf to which the forcibly shutoff command is input. Accordingly, the ECU 70 can recognize that the combustion control using the CNG injector 14 is performed in the state where the communication between the CNG tank 50 and the high-pressure passage 56 is shut off. In addition, as described above, the manual switching valve 52 is not provided with a sensor for detecting the switching state thereof. Accordingly, only on the basis of the fact that the manual switching valve 52 is in the closed state and the combustion control using the CNG injector 14 is selected by the selection switch 76, the ECU 70 cannot recognize that the combustion control using the CNG injector 14 in the state where the communication between the CNG tank 50 and the high-pressure passage 56 is shut off is intended.

(3) When the combustion control using the CNG injector 14 is performed in the state where the communication between the CNG tank 50 and the high-pressure passage 56 is shut off, the second shutoff valve 58 is maintained in the open state. Accordingly, it is possible to satisfactorily remove the CNG in the high-pressure passage 56. Accordingly, when the second shutoff valve 58 or the regulator 60 integrally formed therewith is replaced, the state where a large amount of CNG is discharged from the high-pressure passage 56 does not occur.

Second Embodiment

A second embodiment of the invention will be described below with reference to the accompanying drawings with a focus on the differences from the first embodiment.

In the first embodiment, the predetermined condition for automatically switching the mode to the mode in which the combustion control using the gasoline injector 16 is performed even when the mode in which the combustion control using the CNG is performed is selected by the user's operation of the selection switch 76 is set to the determination result that the amount of CNG remaining in the CNG tank 50 is small. In this embodiment, the predetermined condition includes the determination result that there occurs closed-fixed abnormality that the CNG injector 14 is maintained in the closed state in spite of the opening of the CNG injector 14. This condition is intended to avoid the state where dynamic power requested for the driving wheels is insufficient by the stoppage of the internal combustion engine 10 (so-called engine stall).

In this embodiment, when the closed-fixed abnormality is determined but the first shutoff valve 54 is in the forcibly-closed state, the switching process for the combustion control using the gasoline injector 16 is inhibited.

Figure 5:
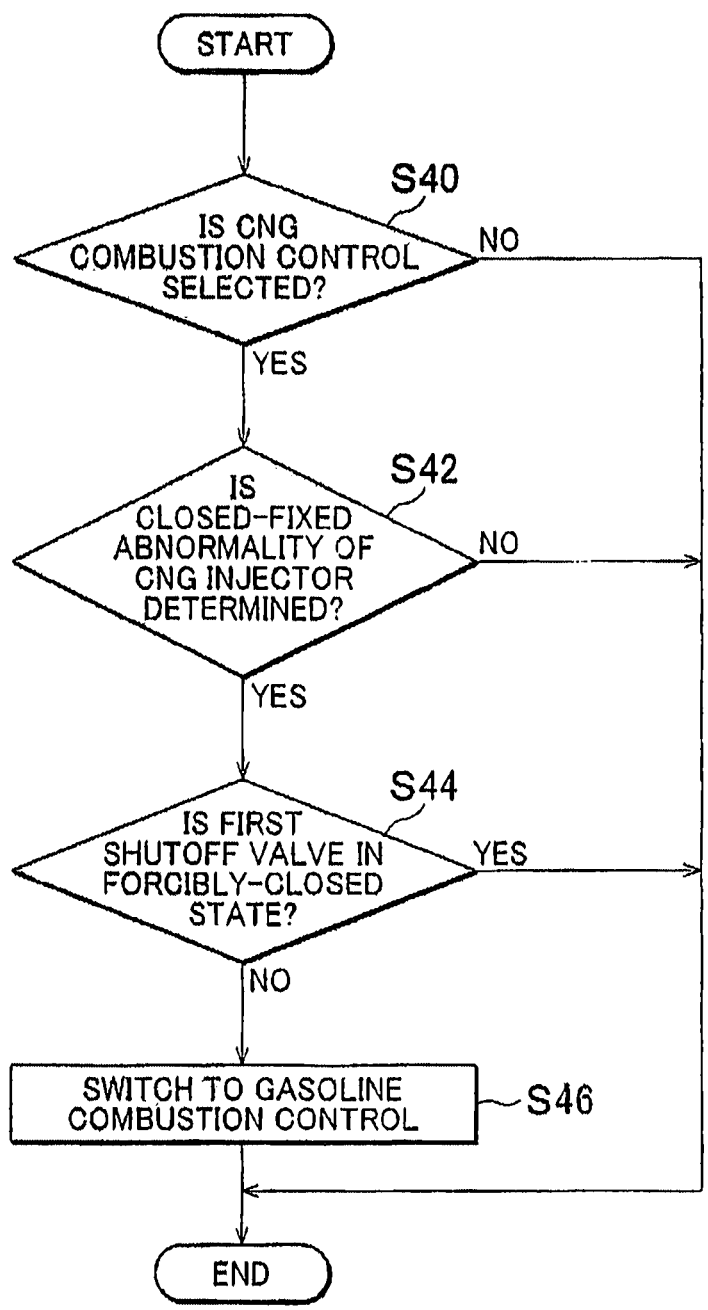
FIG. 5 is a flowchart illustrating a process flow of a switching process to a mode in which gasoline combustion control is performed according to a second embodiment.

FIG. 5 illustrates a process flow of the switching process for the mode in which the combustion control using the gasoline injector 16 is performed at the time of closed-fixed abnormality. This process flow is repeatedly performed, for example, with a predetermined cycle by the ECU 70.

In this series of processes, the ECU 70 first determines whether the mode in which the combustion control using the CNG injector 14 is performed is selected by the operation of the selection switch 76 (S40). When it is determined that the mode in which the combustion control using the CNG injector 14 is performed is selected (YES in step S40), the ECU 70 determines whether the closed-fixed abnormality occurs in the CNG injector 14 (S42). Here, the closed-fixed abnormality can be determined on the basis of the variation in the rotation speed of the crank shaft 26 or can be determined on the basis of other known methods.

When it is determined that the closed-fixed abnormality occurs (YES in step S42), the ECU 70 determines whether the first shutoff valve 54 is in the forcibly-closed state (S44). This process is intended to determine whether to inhibit the switching process for the combustion control using the gasoline injector 16. When it is determined that the first shutoff valve 54 is not in the forcibly-closed state (NO in step S44), the ECU 70 switches the mode to the mode in which the combustion control using the gasoline injector 16 is performed (S46).

The ECU 70 temporarily ends this series of processes when the switching process for the mode in which the combustion control using the gasoline injector 16 is performed is performed, when the determination results of steps S40, S42 are negative, or when the determination result of step S44 is positive.

The operational advantages of this embodiment will be described below. When the determination result of step S44 is positive, the switching process for the mode in which the combustion control using the gasoline injector 16 is performed is not performed. Accordingly, for example, when the first shutoff valve 54 is in the forcibly-closed state, the combustion control using the CNG injector 14 is performed, and the determination of closed-fixed abnormality is performed, the combustion control using the CNG injector 14 not causing the closed-fixed abnormality out of the CNG injectors 14 is performed.

When the determination of closed-fixed abnormality is performed, the abnormality determination history thereof is generally stored in the ECU 70 until replacement is carried out. Accordingly, for example, when both of the first shutoff valve 54 and the second shutoff valve 58 are in the open state, the combustion control using the CNG injector 14 is performed, the determination of closed-fixed abnormality is performed, and then the CNG injector 14 is replaced; the ECU 70 stores the closed-fixed abnormality even at the time of performing the work of removing the CNG. Accordingly, when the forcible shutoff command is not input to the terminal Tf, the switching process for the mode in which the combustion control using the gasoline injector 16 is performed is performed by the process flow illustrated in FIG. 5. On the contrary, in this embodiment, by inputting the forcibly shutoff command to the terminal Tf, the CNG in the CNG delivery pipe 64 or the like can be removed by the combustion control using the CNG injector 14 even when the internal combustion engine 10 is restarted after it is determined that the closed-fixed abnormality occurs in the CNG injector 14.

Correspondence Between Technical Ideas and Embodiments

Representative correspondence between the technical ideas described in the "SUMMARY OF THE INVENTION" and the embodiments will be described below.

Technical Idea 1: The first injector corresponds to reference numeral 14, the reservoir unit corresponds to reference numeral 50, the shutoff valve corresponds to reference numeral 54, the second injector corresponds to reference numeral 16, the first passage corresponds to reference numerals 56, 62, and 64, the second passage corresponds to reference numerals 44, 46, the electronic control unit corresponds to steps S28, S46, the performance inhibition of the switching process corresponds to the setting in case of YES in steps S34, S44, and the gaseous fuel corresponds to CNG.

Technical Idea 2: The first reservoir unit corresponds to reference numeral 50, the second reservoir unit corresponds to reference numeral 40, and the pressure detecting unit corresponds to reference numerals 72, 74.

Technical Idea 3: The process in FIG. 3 when the process of step S34 in FIG. 4 is performed.

Technical Idea 4: see FIG. 5

Technical Idea 5: The opening control unit corresponds to step S14 and the input unit corresponds to reference numeral Tf.

Technical Idea 6: The first shutoff valve corresponds to reference numeral 54, the regulator corresponds to reference numeral 60, and the second shutoff valve corresponds to reference numeral 58.

Other Embodiments

The above-mentioned embodiments may be modified as follows.

"Setting for Removing CNG"

The setting for performing the combustion control using the CNG injector 14 to remove the CNG is not limited to the setting that the first shutoff valve 54 is switched to the closed state. For example, the manual switching valve 52 may be switched to the closed state. In this case, by inputting a signal indicating that the manual switching valve 52 is shut off instead of inputting the forcible shutoff command from the terminal Tf, the ECU 70 can recognize that the manual switching valve 52 is in the closed state. A sensor for detecting the open/closed of the manual switching valve 52 instead of the input to the terminal Tf may be provided and the ECU 70 may receive the output value of the sensor.

The passage for removing the CNG is not limited to both the high-pressure passage 56 and the low-pressure passage 62. For example, only the low-pressure passage 62 may be set. In this case, since the combustion control is performed while switching the second shutoff valve 58 to the closed state, the high-pressure detection value PH does not decrease. Accordingly, even without performing the process of step S34 of FIG. 4, the mode is not switched to the mode in which the combustion control using the gasoline injector 16 is performed by the process flow illustrated in FIG. 3. However, for example, in the configuration in which it is determined that leakage occurs in the low-pressure passage 62 when the high-pressure detection value PH is high and the low-pressure detection value PL is low and the mode is switched to the mode in which the combustion control using the gasoline injector 16 is performed, the inhibiting of the switching process is effective.

The performing of the combustion control using the CNG injector 14 in the state where the first shutoff valve 54 is shutoff is not limited to the premise that an intentional operation is performed on the onboard system from the outside. For example, when it is determined that the closed-fixed abnormality occurs in the CNG injector 14, the combustion control using the CNG injector 14 may be automatically performed in the state where the first shutoff valve 54 is shut off so as to remove the CNG in the low-pressure passage 62 or the high-pressure passage 56. In this case, it is preferable that the combustion control for removing the CNG be performed at the time of fuel cut, for example, by satisfying a performance condition in which an accelerator pedal is released, the rotation speed of the crank shaft 26 is equal to or higher than a prescribed speed, and the like. For example, when the torque command value for the crank shaft 26 is about zero, fine combustion control (pulsation suppressing process) for suppressing a variation in load torque of the crank shaft 26 due to a variation in stroke of intake, compression, combustion, and exhaust may be performed using the CNG injector 14. Accordingly, when a target torque for the crank shaft 26 is great, a disabled state based thereon can be avoided and the process of removing the CNG can be performed. In this case, the switching process for the combustion control using the gasoline injector 16 only has to be inhibited on the condition that the pulsation suppressing process is performed.

"Process of Inhibiting Performing of Switching Process"

In the first embodiment, when the first shutoff valve 54 is shut off by the input of the forcible shutoff command, the process flow of FIG. 3 for determining whether to perform the switching process for the mode in which the combustion control using the gasoline injector 16 is performed may not be performed.

In the first embodiment (FIG. 4), when the first shutoff valve 54 is shut down by the input of the forcible shutoff command, the high-pressure threshold value PthH and the low-pressure threshold value PthL are set to non-conceivable low pressure values, but the invention is not limited to this configuration. For example, the threshold values may be set to a value corresponding to the atmospheric pressure. Accordingly, since the CNG in the high-pressure passage 56 or the CNG in the low-pressure passage 62 is almost removed and the high-pressure detection value PH and the low-pressure detection value PL are almost the atmospheric pressure, the switching process for the mode in which the combustion control using the gasoline injector 16 is performed is performed. Accordingly, for example, before stopping the internal combustion engine 10 for replacement of a component, the rotational energy of the crank shaft 26 generated through the combustion control using the gasoline injector 16 can be converted into electric energy for use, or the like. In this case, it is possible to substantially inhibit the performing of the switching process when the first shutoff valve 54 is shut off and the combustion control using the CNG injector 14 is performed.

"Input Unit"

The input unit is not limited to the terminal Tf to which a signal such as the forcible shutoff command is input. For example, the input unit may be a switch of which a pressing operation gives the forcible shutdown command or the like.

"Internal Combustion Engine"

In the first embodiment, the internal combustion engine 10 is not a multi-cylinder but a single cylinder. In other words, in the second embodiment, the number of cylinders of the internal combustion engine is not limited, as long as a particular number of cylinders is not assumed.

The bifuel internal combustion engine is not limited to the internal combustion engine that can perform the combustion control using the CNG injector 14 as the first injector and the gasoline injector 16 as the second injector. For example, the gaseous fuel injected from the first injector may be hydrogen gas, dimethyl ether (DME), or the like. When the gaseous fuel is DME, it is preferable that the liquid fuel injected from the second injector be diesel oil.

The bifuel internal combustion engine is not particularly limited and for example, an internal combustion engine that can select one of three or more types of fuel and perform the combustion control using an injector injecting the selected fuel may be used.

The fuel injected from the first injector has not to be different from the fuel injected from the second injector. For example, a fuel injector for single gaseous fuel may be used which includes a passage for supplying an injector injecting the fuel into the intake gas passage 12 with fuel of which the pressure is lowered by the regulator and a passage for supplying an injector injecting the fuel into the combustion chamber with the fuel without passing through the regulator.

In this case, by providing the passages with shutoff valves, respectively, the gaseous fuel of the corresponding passage can be removed by the fuel injection control when any one of the injector injecting the fuel into the intake gas passage 12 and the injector injecting the fuel into the combustion chamber is replaced. At this time, in performing the switching process for the mode in which the combustion control using the other injector is performed when the pressure in the fuel supply passage is lowered during performing of the combustion control using any one injector, or the like, there is a possibility that the gaseous fuel will not be removed by the combustion control. Accordingly, the inhibiting of the performing of the switching process is effective.

"Abnormality of Fuel Injection Control"

The abnormality of the fuel injection control is not limited to the closed-fixed abnormality of the CNG injector 14. For example, when gas leaks from the low-pressure passage 62 or the like and the amount of gas leaking is small, it may be necessary to rapidly or sufficiently remove the CNG for the purpose of replacement of a component without waiting for the decrease in the amount of CNG in the low-pressure passage 62 or the like due to the leakage. Accordingly, in performing the switching process for the mode in which the combustion control using the gasoline injector 16 is performed at the time of leakage of gas, the inhibiting of the performing of the switching process for the combustion control using the gasoline injector 16 in the same way as described in the above-mentioned embodiments is effective.

"Second Shutoff Valve 58"

The regulator 60 and the second shutoff valve 58 are not integrally formed with each other necessarily. Even when both are not integrally formed, there is a merit that it is possible to appropriately cope with a situation in which the replacement of a component is carried out on the high-pressure passage 56 side, by maintaining the second shutoff valve 58 in the open state at the time of setting the first shutoff valve 54 to the forcibly-closed state and performing the combustion control using the CNG injector 14. The second shutoff valve 58 is not necessarily provided.

"Others"

The internal combustion engine 10 is not limited to mechanical connection to the driving wheels. For example, an internal combustion engine mounted on a series hybrid vehicle may be used. In this case, the engine stall due to gas shortage or the like is not severe only by mechanically connecting internal combustion engine to the driving wheels, but it may be considered that the internal combustion engine is provided with an automatic switching function of switching the mode in which the combustion control using the CNG injector 14 is performed to the mode in which the combustion control using the gasoline injector 16 is performed in continuously performing the combustion control for power generation. In this case, the process of inhibiting the performing of the switching process is effective.

The invention claimed is:

1. A fuel supply control device for an internal combustion engine, the fuel supply control device comprising:
   a first injector configured to supply gaseous fuel to a combustion chamber of the internal combustion engine;
   a first shutoff valve configured to shut off a fuel supply passage between a first reservoir unit and the first injector, the first reservoir unit being configured to store the gaseous fuel to be supplied to the first injector;
   a second injector configured to supply fuel to the combustion chamber, a first passage that is a passage between the first shutoff valve and the first injector out of the fuel supply passage being different from a second passage for supplying fuel to the second injector; and
   an electronic control unit configured to perform a switching process of switching from a first mode, which performs combustion control of the internal combustion engine by fuel injection control using the first injector, to a second mode, which performs combustion control of the internal combustion engine by fuel injection control using the second injector, the electronic control unit being configured to inhibit the performing of the switching process when a communication state of the fuel supply passage is a closed state in which the first shutoff valve shuts off the fuel supply passage and the combustion control using the first injector is performed.

2. The fuel supply control device according to claim 1, further comprising:
   a second reservoir unit configured to store fuel to be supplied to the second injector; and
   a pressure sensor configured to detect a pressure in the first passage,
   wherein the electronic control unit is configured to perform the switching process when the combustion control using the first injector is performed and the pressure detected by the pressure sensor decreases.

3. The fuel supply control device according to claim 2, wherein the electronic control unit is configured to inhibit the performing of the switching process when the first shutoff valve is in the closed state and the combustion control using the first injector is performed even when the pressure detected by the pressure sensor decreases.

4. The fuel supply control device according to claim 1, wherein the electronic control unit is configured to perform the switching process when the electronic control unit determines that the fuel injection control using the first injector is abnormal.

5. The fuel supply control device according to claim 1, wherein the electronic control unit is configured to perform an open control of the first shutoff valve when the first mode in which the combustion control using the first injector is performed is selected, and
   wherein the electronic control unit is configured to receive an input of a forcible shutoff command for shutting off the first shutoff valve without performing the open control of the first shutoff valve.

6. The fuel supply control device according to claim 1, further comprising:
   a regulator disposed in the first passage; and
   a second shutoff valve disposed in the first passage between the first shutoff valve and the regulator,
   wherein the electronic control unit is configured to inhibit the performing of the switching process when the combustion control using the first injector is performed in a state where the second shutoff valve is opened and the first shutoff valve is closed.

* * * * *